Figure 1:
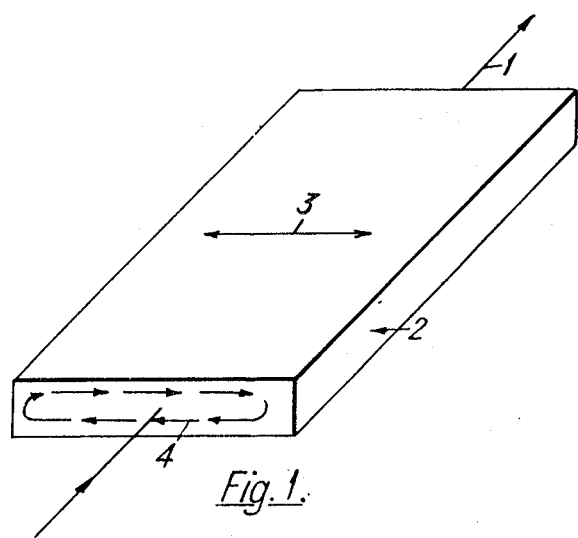

United States Patent
Russen

[15] 3,639,861
[45] Feb. 1, 1972

[54] MAGNETOSTRICTIVE FILTER AND STRAIN GAUGE

[72] Inventor: Albert Russen, Cheshunt, England
[73] Assignee: International Standard Electric Corporation, New York, N.Y.
[22] Filed: Jan. 24, 1968
[21] Appl. No.: 700,230

[30] Foreign Application Priority Data

Feb. 24, 1967 Great Britain.......................8,970/67

[52] U.S. Cl..............................333/71, 333/30 M, 310/26, 73/88.5
[51] Int. Cl........................................H03h 9/22, H01v 9/00
[58] Field of Search...............333/71, 72, 30 M, 30; 310/26; 331/157; 317/143; 340/11; 338/2, 32

[56] References Cited

UNITED STATES PATENTS

| 926,254 | 6/1909 | James | 338/293 X |
|---|---|---|---|
| 2,551,848 | 5/1951 | Parker | 310/26 X |
| 2,854,593 | 9/1958 | Hobrough | 310/26 |
| 3,046,501 | 7/1962 | Dell et al | 333/71 X |
| 3,078,431 | 2/1963 | Denyssen | 338/2 |
| 3,089,108 | 5/1963 | Gong et al | 333/71 X |
| 3,134,953 | 5/1964 | Eisler | 338/2 |
| 3,315,200 | 4/1967 | Hannay | 338/2 |
| 3,366,898 | 1/1968 | Brown et al | 333/71 |

FOREIGN PATENTS OR APPLICATIONS

| 635,704 | 4/1950 | Great Britain | 340/11 |
|---|---|---|---|
| 741,319 | 11/1955 | Great Britain | 310/26 |
| 822,536 | 10/1959 | Great Britain | 333/71 |
| 954,064 | 4/1964 | Great Britain | 333/71 |

OTHER PUBLICATIONS

Perry et al., " The Strain Gage Primer," McGraw-Hill Book Co. 1962, pp. 20– 23, 33– 34, 290– 292
Meitzler, A. H., " Effect of Strain Rate on The Behavior of Iso–elastic Wire Strain Gages," Rev. of Scientific Instruments Vol. 27 No. 1, Jan. 1956 pp. 56
Perry et al., " The Strain Gage Primer," McGraw-Hill Book Co., 1962 pp. 277– 280 and 284– 285
Vigness, I., " Magnetostrictive Electricity in Strain Gages," Rev. of Scientific Instruments Vol. 27 No. 12, Dec. 1956 pp. 1,012– 1,014
Bozorth, R. M., " Magnetoresistance and Domain Theory of Iron–Nickel Alloys," Physical Review, Vol. 70, No. 11 and 12, Dec. 1 and 15, 1946 pp. 923– 932

Primary Examiner—Herman Karl Saalbach
Assistant Examiner—Wm. H. Punter
Attorney—C. Cornell Remsen, Jr., Rayson P. Morris, Percy P. Lantzy, Philip M. Bolton and Isidore Togut

[57] ABSTRACT

One or more layers of magnetostrictive material are arranged to have a meandering current running therethrough or through a closely spaced sheet of conductive material, to provide longitudinal, torsional or flexural modes of mechanical vibration. For torsional vibration a cylindrical structure having a spiral strip either conductive or magnetostrictive, is described. Copper or gold is deposited on the magnetostrictive material. Ladder filters using magnetostrictive structures consist of a thin sheet with a layer of magnetostrictive material thereon suitably cut to provide a number of reeds.

2 Claims, 13 Drawing Figures

Inventor
ALBERT RUSSEN
By Philip M. Bolton
Attorney

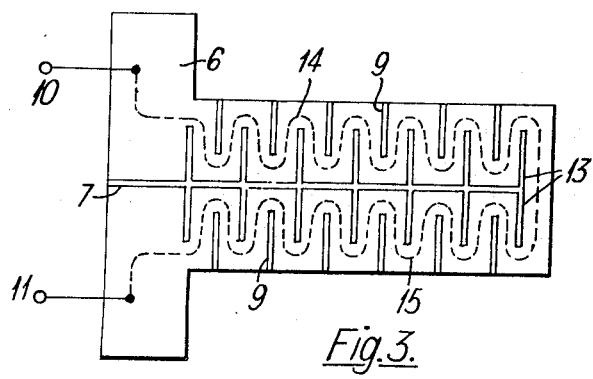
*Fig.3.*
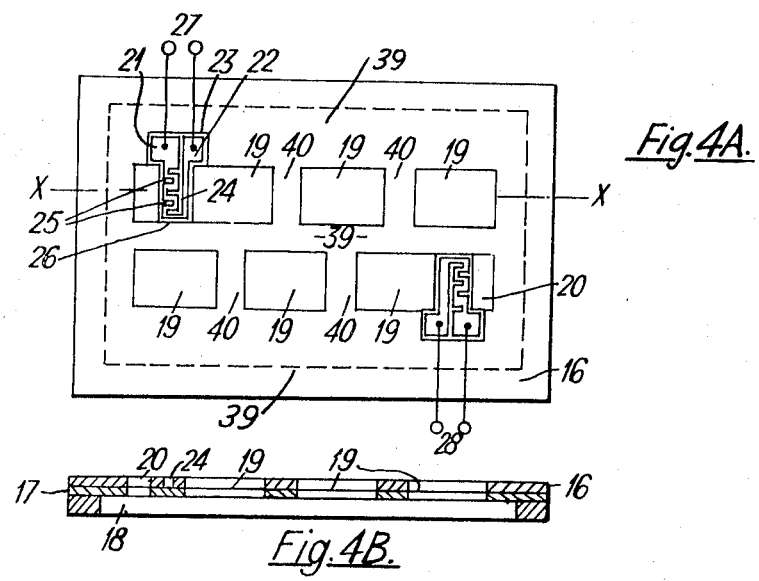
*Fig.4A.*
*Fig.4B.*

PATENTED FEB 1 1972
3,639,861
SHEET 3 OF 4
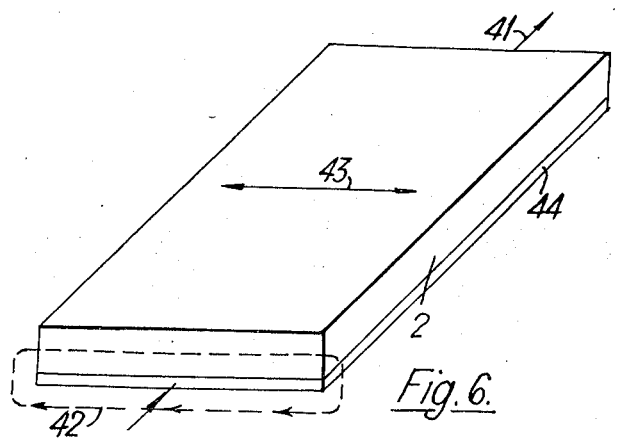
Fig.6.
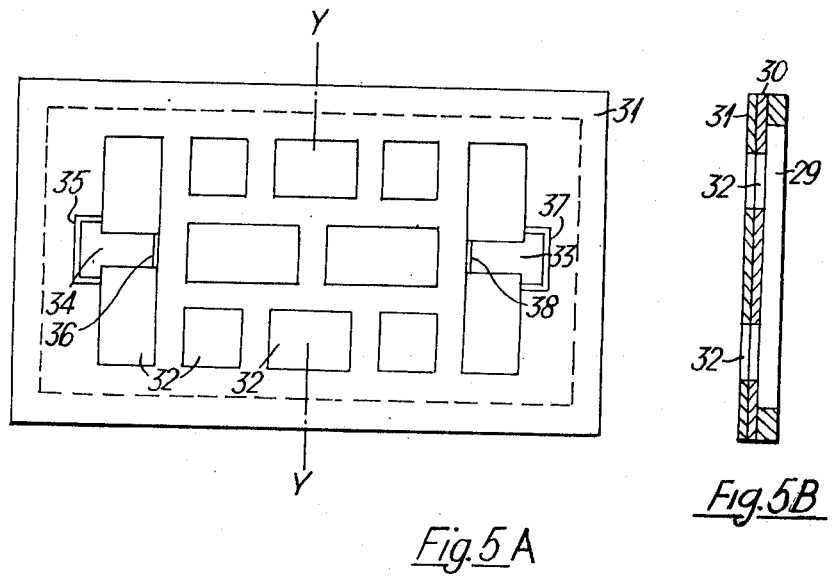
Fig.5A
Fig.5B
Inventor
ALBERT RUSSEN
By Philip M. Bolton
Attorney

INVENTOR
A. RUSSEN

MAGNETOSTRICTIVE FILTER AND STRAIN GAUGE

The invention relates to magnetostriction devices which have particular but not necessarily exclusive application to electromechanical filters and strain gauges.

The invention provides a magnetostriction device including at least one body of magnetostrictive material having spaced contact areas associated therewith, wherein said body is arranged such that the current associated with an electrical signal between said spaced contact areas passes either through or in relation to said body, between said spaced contact areas, in at least one meandering path, and wherein said body is strained in a direction transverse to the current path.

According to one feature of the invention a magnetostriction device as outlined in the preceding paragraph is provided wherein when the current associated with said electrical signal passes through said body said spaced contact areas are attached thereto.

According to another feature of the invention a magnetostriction device as outlined in a preceding paragraph is provided wherein when the current associated with said electrical signal passes in relation to said body said spaced contact areas are attached one at each end of a meandering strip of conductive material which is provided on a surface of said body, said current flowing in said meandering strip in at least one meandering path.

Figure 2A:
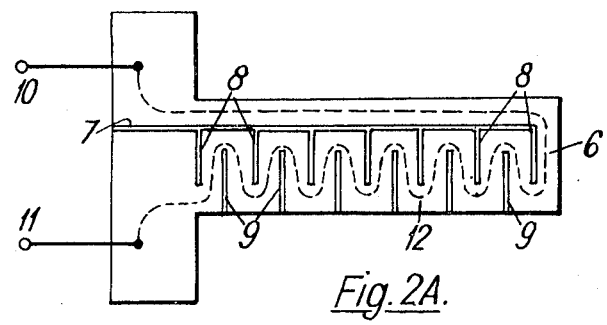
Figure 2B:
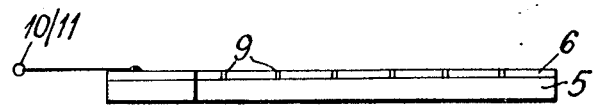
Figure 7A:
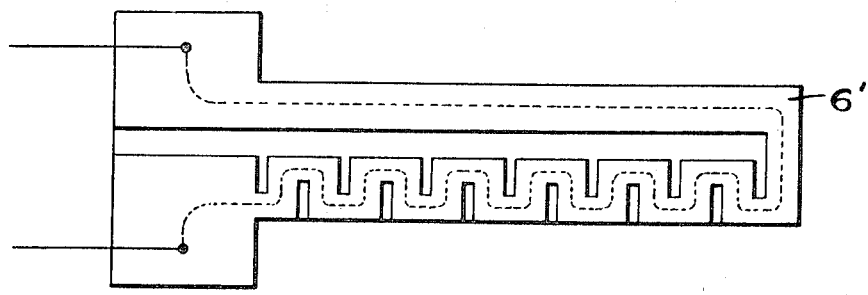
Figure 7B:
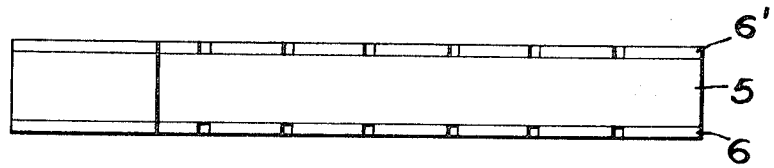
Figure 8:
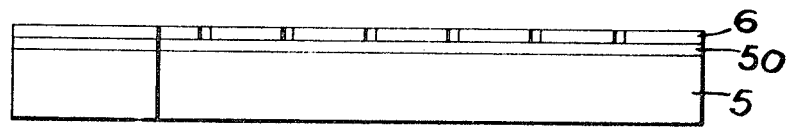
Figure 9:
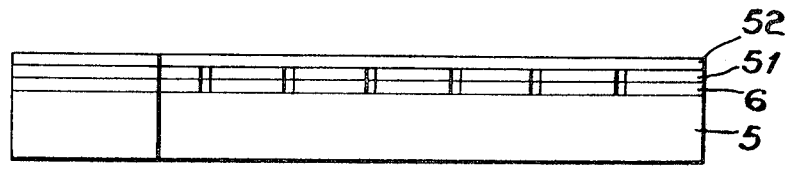

The foregoing and other features according to the invention will be understood from the following description with reference to the accompanying drawings, in which:

FIG. 1 shows a pictorial view of a block of magnetostrictive material and illustrates the principles of operation of magnetostriction device, FIGS. 2A and 2B show respectively a plan view and a front elevation of a magnetostriction device, FIG. 3 shows a plan view of a modified arrangement of the magnetostriction device shown in the drawings according to FIGS. 2A and 2B, FIGS. 4A and 4B show respectively a plan view and a front elevation sectioned along X—X of FIG. 4A of an electromechanical ladder filter, FIGS. 5A and 5B show respectively a plan view and a side elevation sectioned along line Y—Y of FIG. 5A of an electromechanical ladder filter, FIG. 6 shown a pictorial view of the block of magnetostrictive material shown in the drawing according to FIG. 1 having a layer of conductive material on one surface thereof through which the axial current is passed, FIGS. 7A and 7B show respectively a plan view and a front elevation of a magnetostriction device according to the invention, FIG. 8 shows a front elevation of a magnetostriction device having a layer of insulating material located between a substrate and a layer of magnetostrictive material, and FIG. 9 shows a front elevation of a magnetostriction device having two layers of magnetostrictive material separated by a layer of low resistivity material positioned on a substrate.

Referring to FIG. 1, a pictorial view of a block 2 of magnetostrictive material is shown having an axial current 1 passing therethrough. The magnetic field 4 which is produced in the block 2 by the axial current 1 gives rise to a component of strain within the block 2 which acts in a direction transverse to the axial current 1 path as shown by the arrow 3 in the drawing according to FIG. 1.

The strain effects produced in magnetostrictive materials due to current flowing therethrough can be used to activate many different modes of mechanical vibrations, and in particular can be applied to provide longitudinal, torsional or flexural modes of mechanical vibrations.

An example of the flexural mode of mechanical vibration is given in the drawings according to FIGS. 2A and 2B which show respectively a plan view and a front elevation of a magnetostriction device. This device is basically a simple reed which comprises the reed 5 having at one end thereof an integral crossmember to form a T-shaped structure, for example of an insulating material such as glass, and a film 6 of magnetostrictive material, for example nickel or iron which is deposited on the surface of the T-shaped reed structure 5. The strips 7, 8 and 9 of the film 6 are removed by appropriate means to expose the surface of the T-shaped reed structure 5. The meandering strips of magnetostrictive material which remain when the strips 7, 8 and 9 are removed could be deposited directly onto the substrate surface using conventional masking technique to mask those areas of the structure 5 which are represented in the drawing by the strips 7, 8 and 9 before the deposition process. An electrical signal which is applied to the magnetostriction device via the contact areas 10 and 11, which are deposited by appropriate means on the surface of the film 6 and which have electrical interconnecting leads attached thereto, gives rise to an electrical current which flows in the film 6 between the spaced contacts 10 and 11 in a meandering path 12 (shown as a dotted line in the drawing according to FIG. 2A).

Since the magnetostrictive material which forms the deposited film 6 will experience a component of strain in a direction transverse to the current path 12, the reed will be excited to vibrate in flexure at a frequency which is determined by the frequency of the electrical signal applied between the spaced contact areas 10 and 11.

A static bias current may be applied between the spaced contact areas 10 and 11 and the current flow due to the electrical signal would be superimposed on the static bias current to initiate the flexural vibrations or alternatively the static bias current could be eliminated if remanence is use.

The magnitude of the transverse component of strain may be increased for a given current flow by increasing the number of current meander paths between the spaced contact areas 10 and 11. This is illustrated in the drawing according to FIG. 3 which shows a plan view of a modified arrangement of the magnetostriction device shown in the drawings according to FIGS. 2A and 2B. In this device two meandering current paths 14 and 15 (shown as dotted lines in the drawing according to FIG. 3) are provided by removing the strips 7, 9 and 13 of the film 6 by appropriate means to expose the surface of the T-shaped reed structure or by deposition using a suitable masking technique. It should be noted that there is no limit to the number of meandering current paths which as previously stated are produced by selectively removing strips of film 6, except the physical dimensions of the particular magnetostriction device.

Alternatively, the basic construction of the magnetostriction devices outlined in the preceding paragraph may be as shown in the drawing according to FIG. 6 wherein the block 2 of magnetostrictive material shown in the drawing according to FIG. 1 is provided with a layer 44 of conductive material on one surface thereof through which an axial current 41 is passed. The magnetic field 42 which is produced in the block 2 by the axial current 41 gives rise to a component of strain within the block 2 which acts in a direction transverse to the axial current path as shown by the arrow 43.

In order to utilize this latter method of construction, illustrated in FIG. 6, for the magnetostriction devices outlined in preceding paragraphs, the T-shaped reed structure of the devices shown in the drawings according to FIGS. 2A, 2B and 3 would need to be of magnetostrictive material. The electrical signal which is applied to the magnetostriction device via the contact areas 10 and 11 gives rise to an electrical current which flows in the film 6 of conductive material between the spaced contacts 10 and 11 in at least on meandering path to cause the magnetostrictive material which forms the T-shaped reed structure to experience a component of strain in a direction transverse to the current path thereby causing the reed to be excited to vibrate in flexure at a frequency which is determined by the frequency of the electrical signal applied between the spaced contact areas 10 and 11. A static bias current may be applied between the spaced contact areas of these devices or remanence may be used.

While the magnetostriction devices outlined in the preceding paragraphs with reference to the drawings according to FIGS. 2A, 2B and 3 may be arranged to operate in a longitudinal mode of mechanical vibrations by exciting the device at the longitudinal resonance frequency they may also be arranged to operate in this mode by providing on the surface of the T-shaped reed structure directly opposite the film 6 a further deposited thin film 6', as shown in FIG. 7B, he plan view of FIG. 7B being shown in FIG. 7A, of either a magnetostrictive material, for example nickel or iron, when the T-shaped reed structure is of an insulating material or a conductive material when the T-shaped reed structure is of magnetostrictive material, strips of which should be removed to expose the surface of the T-shaped reed structure and to provide the requisite number of meandering current paths.

In order to ensure that the magnetostriction device having a T-shaped reed structure 5 of insulating material operates in the longitudinal mode of mechanical vibrations it is necessary to ensure that the magnetostrictive material which forms the deposited films on both sides of the T-shaped reed structure have the same magnetostriction properties i.e., both films must exhibit either positive magnetostriction, for example as exhibited by nickel, or negative magnetostriction, for example as exhibited by iron and the current passed through the deposited films must flow in the same direction between the spaced contact areas on each of the films.

If the two deposited films of magnetostrictive material have different magnetostriction properties or if the current is passed through the two deposited films in opposite directions between the spaced contact areas then the magnetostriction device would operate in a flexural mode of mechanical vibrations since the second film, 6', on the surface of the T-shaped reed structure which is directly opposite the film 6 under these conditions would bend in the same direction as the film 6 to give the flexural mode of mechanical vibrations instead of bending in the opposite direction to the film 6 to give the longitudinal mode of mechanical vibrations. It should be noted however that a longitudinal mode of mechanical vibrations can be set up in the device with deposited films of opposite magnetostriction properties by passing the current through the deposited films in opposite directions between the spaced contact areas.

In order to ensure that the magnetostriction device having a T-shaped reed structure 5 of magnetostrictive material operates in the longitudinal mode of mechanical vibrations it is necessary to ensure that the static bias current applied between the spaced contact areas on the meandering strips of conductive material on each side of the T-shaped reed structure are of the same polarity or if remanence is used then both sides of the T-shaped reed structure must be polarized magnetically in the same direction. Also the signal applied between the spaced contact areas on each of the meandering strips of conductive material to initiate the longitudinal mode of mechanical vibrations must have the same phase relationship.

If the two surfaces of the T-shaped reed structure are polarized magnetically in opposite directions then in order to ensure that the magnetostriction device operates in the longitudinal mode of mechanical vibrations it is necessary that the signals applied between the spaced contact areas should be 180° out of phase otherwise if they are of the same phase relationship the magnetostriction device would operate in a flexural mode of mechanical vibrations. Similarly, if both sides of the T-shaped reed structure are magnetically polarized in the same direction and the signals applied between the spaced contact areas are 180° out of phase then the magnetostriction device will operate in a flexural mode of mechanical vibrations.

The torsional mode of mechanical vibrations which are obtained using the strain effects produced in magnetostrictive materials due to the passage of a current therethrough or through a conducting layer contiguous therewith may be obtained by depositing either the layer of conducting material or the film of magnetostrictive material for example nickel or iron on the outer surface of, for example, a cylindrical solid rod or tube and cutting a spiral or helical groove in the layer or film thereby exposing the outer surface of the rod or tube and leaving a spiral or helical strip of either the conducting material or the magnetostrictive material around the outer surface and along the length of the rod or tube. Contact areas are deposited one at each end of the spiral or helical strip between which the electrical signal is applied. The current due to the electrical signal is applied. The current due to the electrical signal will therefore pass through the strip in a spiral or helical path between the spaced contact areas and the component of strain which as previously stated is transverse to the direction of the current path will cause the rod or tube to be strained torsionally thereby setting up the torsional mode of mechanical vibrations having a frequency which is determined by the frequency of the electrical signal.

As previously stated, a static bias current may be applied between the spaced contact areas or remanence may be used and it should be noted that the magnitude of the torsional strain may be increased by cutting additional spiral or helical grooves in the deposited layer or film to provide more than one current path between the spaced contact areas.

The systems outlined above are reciprocal providing the static bias current is applied between the spaced contact areas or remanence exists a. Therefore the magnetostriction devices can also be used to detect mechanical vibrations. Similar devices can be employed for both drive and pick up functions therefore these devices may be employed for example in microminiature filter arrangement. In this application the device or devices would be suitably connected to the vibrating reeds of the electromechanical filter and sued as either the filter driving means, filter output detecting means or both the filter driving and output detecting means.

In the magnetostriction devices outlined in preceding paragraphs which utilize a T-shaped reed structure of insulating material having deposited films of magnetostrictive material thereon, skin effects which result in the deposited films at high frequencies cause a reduction in the efficiency of these magnetostriction devices. This problem can however be overcome, as shown in FIG. 9, by depositing on the surface of the film 6 of magnetostrictive material a layer of low resistivity material 51, for example copper or gold such that the exposed strips of the T-shaped reed structure and the spiral or helical groove(s) of the outer surface of the rod or tube remain exposed. The spaced contact areas would be deposited by appropriate means onto the deposited layer of low resistivity material and contact leads would be attached thereto. In this way the magnetic field produced by the current passing through the magnetostriction device would be shared by the deposited layer of low resistivity material and the deposited film of magnetostrictive material and will therefore increase the frequency level at which the skin effects in the deposited films will occur.

For low frequency operation of these magnetostriction devices the additional layer of low resistivity material has the advantage that the loss resistance of the device is reduced.

If desired, a further layer of magnetostrictive material 52 may be deposited onto either the surface of the layer of low resistivity material or the surface of surfaces of the T-shaped reed structure on which the meandering strip or strips of conductive material are formed, such that the meandering strips are completely covered. The further layer of magnetostriction material will either increase or decrease the component of transverse strain, this factor depending of course on whether or not the further layer exhibits the same or opposite magnetostriction properties as either the film 6 or the T-shaped reed structive 5 as the case may be. In practice, a further layer which exhibits the same magnetostriction properties could be added where the physical limitations of the magnetostriction device are such that a sufficient number of meandering current paths cannot be obtained in the single layer device to produce the desired degree of strain.

In the case of the magnetostriction device having a T-shaped reed structure 5 of magnetostrictive material, the mode of mechanical vibrations of a particular magnetostriction device having a further layer or layers of magnetostrictive material is determined by either the thickness of the further layer with respect to the thickness of the T-shaped reed structure 5, or the magnetostriction properties of the further layer and the T-shaped reed structure 5 or in the case of the T-shaped reed structure 5 of magnetostrictive material having meandering strips of conductive material and a further layer of magnetostrictive material on each of two opposite surfaces, by phase relationships of the signals applied between the contact areas 10 and 11 or the direction of the magnetic polarity of the further layer of magnetostrictive material with respect to the direction of the magnetic polarity of the adjacent surface of the T-shaped reed structure 5 of magnetostrictive material, or a combination of any of the above-mentioned features.

To illustrate the effects of the features outlined in the preceding paragraph on the mode of mechanical vibrations of a particular magnetostriction device, a magnetostriction device having meandering strips or strip on only one surface of the T-shaped reed structure 5 and a further layer of magnetostriction material which completely covers the meandering strip or strips will be considered. In this device, the T-shaped reed structure 5 and the further layer would be polarized magnetically in the same direction therefore the only considerations are the relative thicknesses of the further layer and the T-shaped reed structure 5 and their magnetostriction properties.

If the further layer of magnetostrictive material is of the same thickness and magnetostriction properties, i.e., negative or positive, as the T-shaped reed structure 5 then the predominant mode would be longitudinal mode of mechanical vibrations when the alternating electrical signal is applied between the contact areas 10 and 11 since the further layer would bend in the opposite direction to the T-shaped reed structure 5 under these conditions. However, if the further layer exhibited different magnetostriction properties than the T-shaped reed structure 5 then it would bend in the same direction as the T-shaped reed structure thereby giving rise to a predominant flexural mode of mechanical vibrations when the alternating electrical signal is applied between the contact areas 10 and 11.

If the T-shaped reed structure 5 is of a thickness which is considerably in excess of the thickness of the further layer then the predominant mode would be a flexural mode of mechanical vibrations when the alternating electrical signal is applied between the contact areas 10 and 11 irrespective of whether the further layer exhibits the same or opposite magnetostriction properties to the T-shaped reed structure 5. The reason for the flexural mode of mechanical vibrations when the magnetostriction properties are the same is because of the greater mass of the T-shaped reed structure 5, only the surface of which would be magnetically polarized and affected by the component of strain therefore the components of strain in both members would be additive thereby resulting in a predominant flexural mode of mechanical vibrations.

Considering now a magnetostriction device wherein the T-shaped reed structure 5 of magnetostrictive material is provided with meandering strips or strip of conductive material and a further layer of magnetostrictive material on each of two opposite faces, each forming the same meandering path. In this case if the magnetic polarities of the further layers and the adjacent surfaces of the T-shaped reed structure are in the same direction and the alternating electrical signals applied between the contact areas 10 and 11 on each of the meandering strips are in phase then the predominant mode of mechanical vibrations will be a longitudinal mode since both the further layers would tend to bend in opposite directions to the surface of the T-shaped reed structure on which they are deposited. However, if the alternating electrical signals are 180° out of phase or one of the further layers and the surface of the T-shaped reed structure 5 contiguous therewith are magnetically polarized in the opposite direction to the other further layer and the surface of the T-shaped reed structure contiguous with the other further layer, or if one of the further layers exhibits different magnetostriction properties to the T-shaped reed structure 5 and the other further layer then the predominant mode of mechanical vibrations would be a flexural mode.

Also, the magnetostriction device outlined in the preceding paragraph having one of the further layers exhibiting different magnetostriction properties to the magnetostrictive material from which the T-shaped reed structure 5 is formed and the other further layer, could be arranged to operate in a predominant longitudinal mode of mechanical vibrations when an alternating electrical signal is applied between the contact areas 10 and 11 by either magnetically polarizing the further layer which exhibits different magnetostriction properties and the surface of the T-shaped reed structure contiguous therewith in the opposite direction to the other layer and the surface of the T-shaped reed structure contiguous the other layer, or causing the alternating electrical signals to be 180° out of phase.

The input reactance of the magnetostriction devices having an insulating T-shaped reed structure 5 is inductive and a capacitance may be required in order to tune the devices. The capacitance may be either active or passive and in either case may be included as part of the magnetostriction device by depositing same on the insulating substrate.

It should be noted that the magnetostriction devices outlined in the preceding paragraphs having T-shaped reed structure of a magnetostrictive material would need to be constructed from insulating magnetostrictive material, for example, a ceramic before the magnetostriction devices would function in the manner described. However these magnetostriction devices may be constructed from conducting magnetostrictive material, for example, nickel which exhibits positive magnetostriction properties or iron which exhibits negative magnetostriction properties provided an insulating interlayer is interposed between the substrate or T-shaped reed structure and the meandering strip or strips of conductive material.

It should also be noted that the magnetostrictive devices outlined in the preceding paragraphs having T-shaped reed structures of an insulating material may be constructed by utilizing T-shaped reed structures of either semiconductive or conductive material providing there is an interlayer of insulating material between the deposited film(s) of magnetostrictive material and the T-shaped reed structure, as shown in FIG. 8 where the insulating material is indicated at 50 and the magnetostrictive material is indicated at 6.

The magnetostriction devices outlined in the preceding paragraphs have many applications, they may as previously stated be used as part of electromechanical filter arrangements or they may be used for example as strain gauges.

For the strain gauge application the magnetostriction device would have either a static bias current applied between the spaced contact areas or remanence could be used and the magnetostriction material when strained for example either torsionally, flexurally or longitudinally would cause a variation in the current flowing through the meandering strip of conductive material, these current variations as detected between the spaced contact areas would be a measure of the degree of strain variations. Alternatively, the devices may be used as gramophone pickups or as travelling wave amplifiers if the meandering strip(s) of magnetostrictive material can be loaded to reduce the electrical delay to that of the acoustic delay.

Referring to FIGS. 4A and 4B a plan view and a sectioned side elevation of an electromechanical ladder filter are respectively shown which may be driven by any one of the magnetostriction devices outlined in the preceding paragraphs with reference to the drawings according to FIGS. 2A, 2B and 3 but for clarity the simple device shown in the drawings according to FIGS. 2A and 2B having a T-shaped reed structure of insulating material is used. It should be noted however that the electromechanical ladder filter shown in the drawings according to FIGS. 4A and 4B may be driven by any other device which initiates the necessary driving force, for example piezoelectric devices may be used in place of the magnetostriction devices.

The electromechanical ladder filter shown in the drawings according to FIGS. 4A and 4B is a simple resonant structure which is suitable for fabrication in microminiature form and which comprises a thin sheet 17 of either conducting material having a low coefficient of expansion, for example a metal such as Ni Span C, or insulating material, for example glass or quartz, coated with a film 16 of magnetostrictive material, for example nickel or iron, and having rectangular apertures 19 and 20 removed by appropriate means to form the ladder structure i.e., the coupler flexural springs 39 and the six reeds 40.

The magnetostriction devices are formed by the reeds 40 which are located between the apertures 20 and the adjacent apertures 19 and the film 16 of magnetostrictive material contiguous therewith. The magnetostriction devices are isolated from the remaining structure by removing by appropriate means strips 23 and 26 of the film 16. The meandering current paths are formed by removing by appropriate means strips 24 and 25, and the spaced contact areas between which the input or output signals appear are deposited one on each of the isolated regions 21 and 22 of the film 16 and have interconnection wires attached thereto by appropriate means.

For convenience the spaced contact areas 27 are considered as the input terminals and the spaced contact areas 28 are considered as the output terminals. The application of an electrical signal at the input terminals 27 of one of the magnetostriction devices will cause the six reeds 40 which are coupled at the antinodes by flexural springs to vibrate in flexure and these vibrations will be detected at the output terminals 28 of the other magnetostriction device to give an output signal which has been filtered as desired. As previously stated the input and output magnetostriction devices will either be employing remanence or a static bias current not shown in the drawings will be applied between the spaced contact areas 27 and 28.

The structure may, if desired, be mounted on a rigid base 18 as shown in the drawings according to FIGS. 4A and 4B which has a window cutout to expose the filter section and thus avoid interfering with the vibrating system.

While this type of structure has been described with only one transmission path it is adaptable for use with tow or more transmission paths as shown in the drawings according to FIGS. 5A and 5B which show respectively plan view and a sectioned side elevation of an electromechanical ladder filter with two transmission paths which may be designed to give attenuation peaks in the stop-bands. The construction of this filter is exactly the same as the one shown in the drawings according to FIGS. 4A and 4B except the removal of twelve apertures 32 from the thin sheet 30 having a film 31 of magnetostrictive material deposited thereon provides two transmission paths. The two magnetostriction devices 34 and 33 are respectively isolated from the remaining structure by removing by appropriate means strips 35 and 36 and strips 37 and 38. As previously stated, the structure may, if desired, be mounted on a rigid base 29 which has a window cutout to expose the filter section and thus avoid interfering with the vibrating system.

It should be noted that although the reeds which form the electromechanical filters shown in drawings according to FIGS. 4A, 4B and 3 are shown connected at the antinodes of the reeds by the flexural springs, the electromechanical filters may be arranged such that the reeds are coupled together at the nodes of the reeds or at a point on the reeds anywhere between the antinodes and the nodes of the reeds, the point of connection depending on the bandwidth requirements for the electromechanical filter.

It is to be understood that the foregoing description of specific examples of this invention is made by way of example only and is not to be considered as a limitation on its scope.

I claim:

1. An electromagnetic filter comprising:
  a body of magnetostrictive material;
  first means providing space contact areas;
  second means connected to said contact areas providing a meandering electrical current path producing a strain in said body in a direction transverse to said current path;
  a film of magnetostrictive material; and
  a sheet on which said film is supported, said sheet and film having apertures therein forming a ladder structure consisting of reeds and couplers connecting said reeds,
  said sheet further coupling said body to said reeds.

2. A magnetostriction device comprising:
  a body of magnetostrictive material, said body including:
  a first layer of magnetostrictive material;
  a substrate on whose surface said layer of magnetostrictive material is deposited;
  a layer of low resistivity material deposited on the surface of said first layer of magnetostrictive material opposite said substrate;
  a second layer of magnetostrictive material on the surface of said layer of low resistivity material opposite said first layer of magnetostrictive material;
  first means attached to said body providing spaced contact areas thereon; and
  second means connected to said contact areas providing a meandering electrical current path through said body producing a strain in said body in a direction transverse to said current path.

* * * * *